United States Patent
Buytaert et al.

(10) Patent No.: US 7,004,704 B1
(45) Date of Patent: Feb. 28, 2006

(54) FLUTE POSITIONER

(75) Inventors: Donald Buytaert, Huntley, IL (US); Richard J. Ernst, San Diego, CA (US); George Matthew Davis, Stone Mountain, GA (US); David W. Jablonski, Warrenville, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/955,437

(22) Filed: Sep. 30, 2004

(51) Int. Cl.
*F16B 15/00* (2006.01)

(52) U.S. Cl. .................................................. 411/441
(58) Field of Classification Search ................ 411/441, 411/440
See application file for complete search history.

(56) References Cited

U.S. PATENT DOCUMENTS

| | | | |
|---|---|---|---|
| 2,676,508 A * | 4/1954 | Erickson ...................... 411/441 |
| 2,968,984 A * | 1/1961 | De Caro ...................... 411/441 |
| 3,137,195 A * | 6/1964 | Rosenberg .................. 411/441 |
| 3,377,903 A * | 4/1968 | Korte .......................... 411/441 |
| 3,382,751 A * | 5/1968 | Kopf ........................... 411/439 |
| 3,428,169 A * | 2/1969 | Martin ........................ 206/343 |
| 3,452,637 A * | 7/1969 | O'Brien ...................... 411/439 |
| 3,490,329 A * | 1/1970 | Pratorius .................... 411/441 |
| 3,491,933 A * | 1/1970 | Thurner et al. ............. 227/139 |
| 3,516,323 A * | 6/1970 | O'Brien ...................... 411/441 |
| 3,841,474 A * | 10/1974 | Maier ......................... 206/346 |
| 3,955,674 A * | 5/1976 | Maier et al. ................ 206/347 |
| 3,978,759 A * | 9/1976 | Bakoledis ................... 411/441 |
| 3,981,604 A * | 9/1976 | Cenis .......................... 408/728 |
| 4,286,496 A * | 9/1981 | Harris ......................... 411/441 |
| 4,669,169 A * | 6/1987 | Hogg ........................... 29/432 |
| 4,932,821 A * | 6/1990 | Steffen et al. .............. 411/442 |
| 4,979,858 A * | 12/1990 | Van Allman et al. ....... 411/441 |
| D322,018 S * | 12/1991 | Van Allman et al. .......... D8/70 |
| 5,069,340 A * | 12/1991 | Ernst et al. ................. 206/347 |
| D326,988 S * | 6/1992 | Beton ............................ D8/70 |
| 5,125,616 A * | 6/1992 | Rothenbuehler et al. ....... 249/3 |
| 5,292,216 A * | 3/1994 | Van Allman ................ 411/441 |
| 5,366,082 A * | 11/1994 | Haytayan .................... 206/343 |
| 5,417,534 A * | 5/1995 | Losada ........................ 411/441 |
| 5,443,345 A * | 8/1995 | Gupta ......................... 411/441 |
| 5,525,018 A * | 6/1996 | Losada ........................ 411/441 |
| 5,569,010 A * | 10/1996 | Janssen et al. ............. 411/441 |
| 5,620,288 A * | 4/1997 | Janssen et al. ............. 411/441 |
| 5,624,220 A * | 4/1997 | Janssen et al. ............. 411/441 |
| 5,632,585 A * | 5/1997 | Kluser ........................ 411/441 |

(Continued)

OTHER PUBLICATIONS http://www.plasticusa.com/pvc.html.*

(Continued)

*Primary Examiner*—Robert J. Sandy
*Assistant Examiner*—Jeffrey A. Sharp
(74) *Attorney, Agent, or Firm*—Lisa M. Soltis; Mark W. Croll; Greer, Burns & Crain, Ltd.

(57) ABSTRACT

A flute positioner is provided for positioning a fastener in a tool barrel, and includes a body, a throughbore extending through the body, and at least one holding member extending into the throughbore. One or more extensions may extend radially outward from the body.

16 Claims, 5 Drawing Sheets

U.S. PATENT DOCUMENTS

| | | | | |
|---|---|---|---|---|
| 5,803,691 A | * | 9/1998 | Huang | 411/442 |
| 5,833,420 A | * | 11/1998 | Schmidle et al. | 411/441 |
| 6,039,525 A | * | 3/2000 | Johnson | 411/353 |
| 6,162,002 A | * | 12/2000 | Rohrmoser et al. | 411/441 |
| 6,688,829 B1 | * | 2/2004 | Popovich et al. | 411/441 |
| D489,968 S | * | 5/2004 | Kovac | D8/399 |
| 6,779,959 B1 | * | 8/2004 | Yang | 411/443 |
| 6,814,231 B1 | * | 11/2004 | Gupta | 206/347 |
| 6,823,990 B1 | * | 11/2004 | Gaudron | 206/347 |
| 6,824,342 B1 | * | 11/2004 | Gassmann et al. | 411/441 |

OTHER PUBLICATIONS http://www.lakesideplastic.net/plastisol.htm.*

Powers Fasteners, "Powder Actuated Fastening Systems," believed available circa 2004.

Hilti Corp., "X-FB DNI Metal Conduit/Pipe Clip for Concrete," Sales sheet, believed available circa 2001.

TTW/Ramset, "Ramset Fastening Systems," see particularly pgs. 24-30, believed available circa 2002.

* cited by examiner

FLUTE POSITIONER

FIELD OF THE INVENTION

The present invention is related to fastener positioners and holders.

BACKGROUND OF THE INVENTION

Fasteners such as nails, screws, bolts and the like are well known in the art, and may be used in a variety of applications, including for attaching brackets and other items to a substrate. One exemplary fastener is a nail or pin useful for insertion into a substrate such as a wall, ceiling, or other surface. A hammer or an automated driving tool such as a pneumatic or powder-actuated tool may be used to drive the nail.

In such operation, the angle of incidence of the fastener into the underlying substrate can be important to the holding power of the fastener. Often, it is desired to achieve an insertion angle substantially close to 90°. To accomplish this, the fastener should be generally transverse to the substrate surface when it receives a driving force from a tool. If the driving tool includes a barrel for impacting the fastener with the driving force, it may also be desirable to insert the fastener into the barrel and have it held therein. The driving tool can then be located at a desired location for driving the fastener into the substrate. When this is accomplished, "one-handed" operation of the tool may be practiced wherein an operator is not required to hold the fastener in place for operation on by the tool.

It is known to use a holder for holding the fastener head in the tool barrel. For example, a thin ring with outwardly extending pliable fingers may be positioned on the fastener shaft. The fingers of the ring engage the wall of a tool barrel when the fastener is inserted therein to help center the fastener within the barrel.

Known positioner rings fail to solve several problems in the art, however. For example, known positioner ring fingers may fail to engage the tool barrel with satisfactory firmness or friction, with the result that insufficient guidance is provided when the fastener is driven into a substrate. An undesirable variance of angle of insertion can result. This can lead to diminished fastener holding power, to bent or deformed fasteners, or even to fastener failure. Also, different diameter rings may be needed for fasteners of different diameters, and different sized fingers are required for use with different diameter tool barrels. This results in a number of different positioner rings being required, lowering the efficiency of their manufacture. Accordingly, needs and problems remain unresolved in the art.

SUMMARY OF THE INVENTION

A flute positioner is provided for positioning a fastener in a tool barrel. An exemplary flute positioner includes a body, a throughbore extending through the body, and at least one holding member extending into the throughbore.

DETAILED DESCRIPTION

Figure 1:
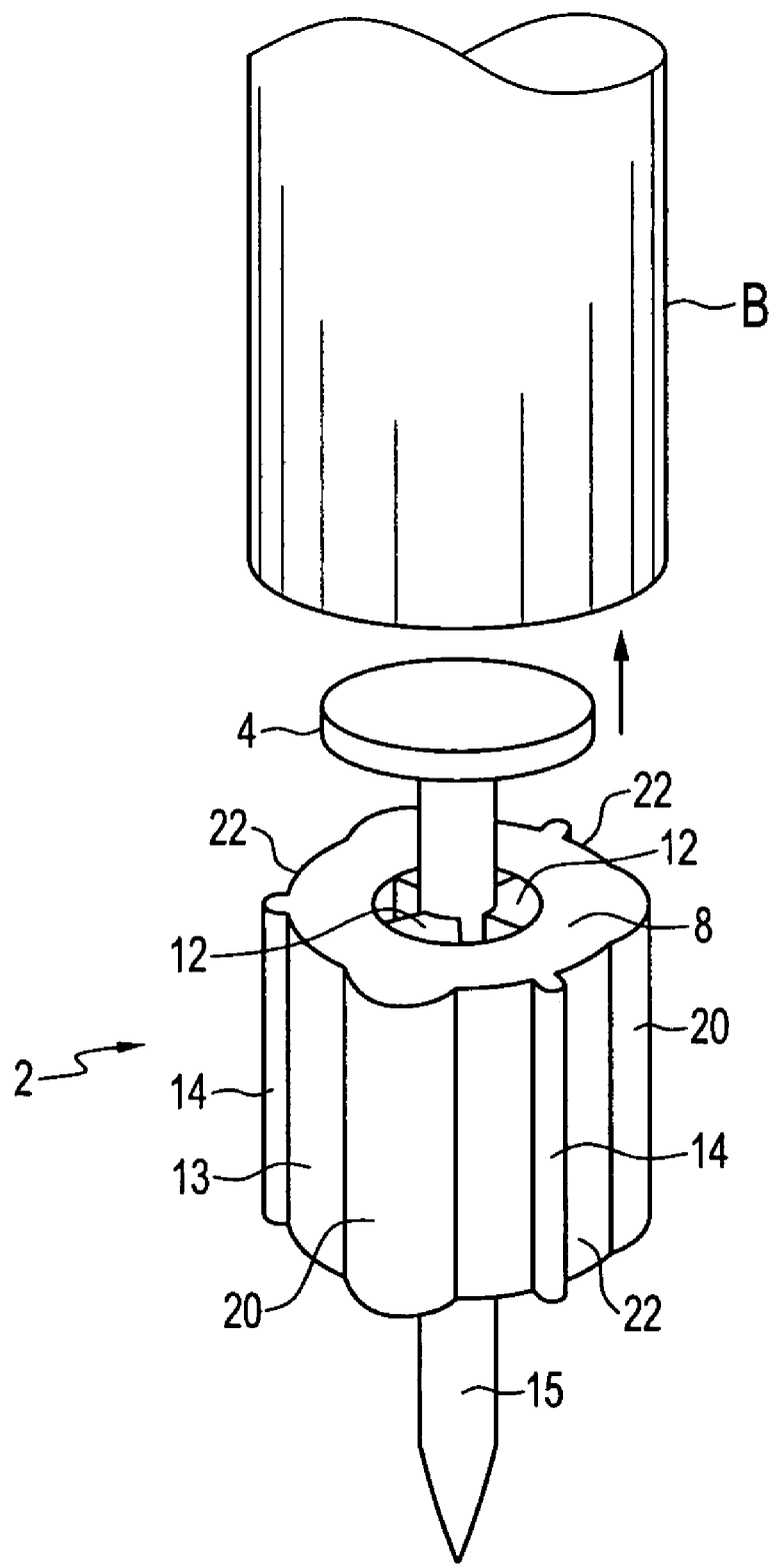
FIG. 1 is a perspective of an embodiment of the present flute positioner engaged on a fastener and being inserted into the barrel of a driving tool.

Turning now to the drawings, an exemplary flute or flute positioner is shown generally at 2 in FIG. 1 with a fastener 4 engaged therein. The flute positioner 2 is configured for being engaged in the barrel B of a driving tool such as a pneumatic or powder-actuated tool. Once engaged in the barrel B, the flute positioner 2 frictionally holds the fastener 4 in position for receiving a driving force from the driving tool. When the driving force is received the fastener 4 with the flute positioner 2 attached may be ejected from the barrel of the tool and the fastener 4 driven into a substrate. The flute positioner 2 may completely or partially split apart. A portion of the flute positioner 2 may be retained in a deformed condition between the head of the fastener 4 and the substrate.

Figure 2:
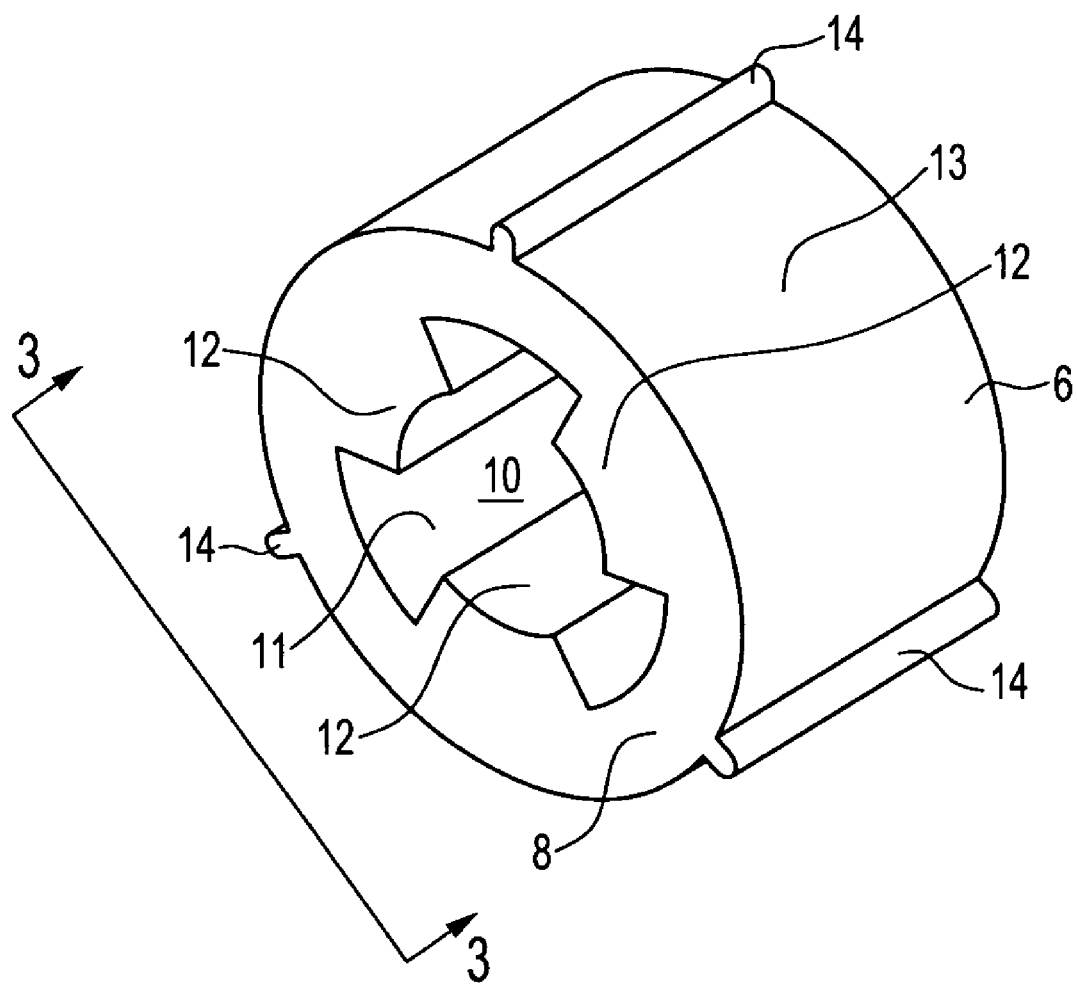
FIG. 2 is a perspective of an exemplary flute positioner.
Figure 3:
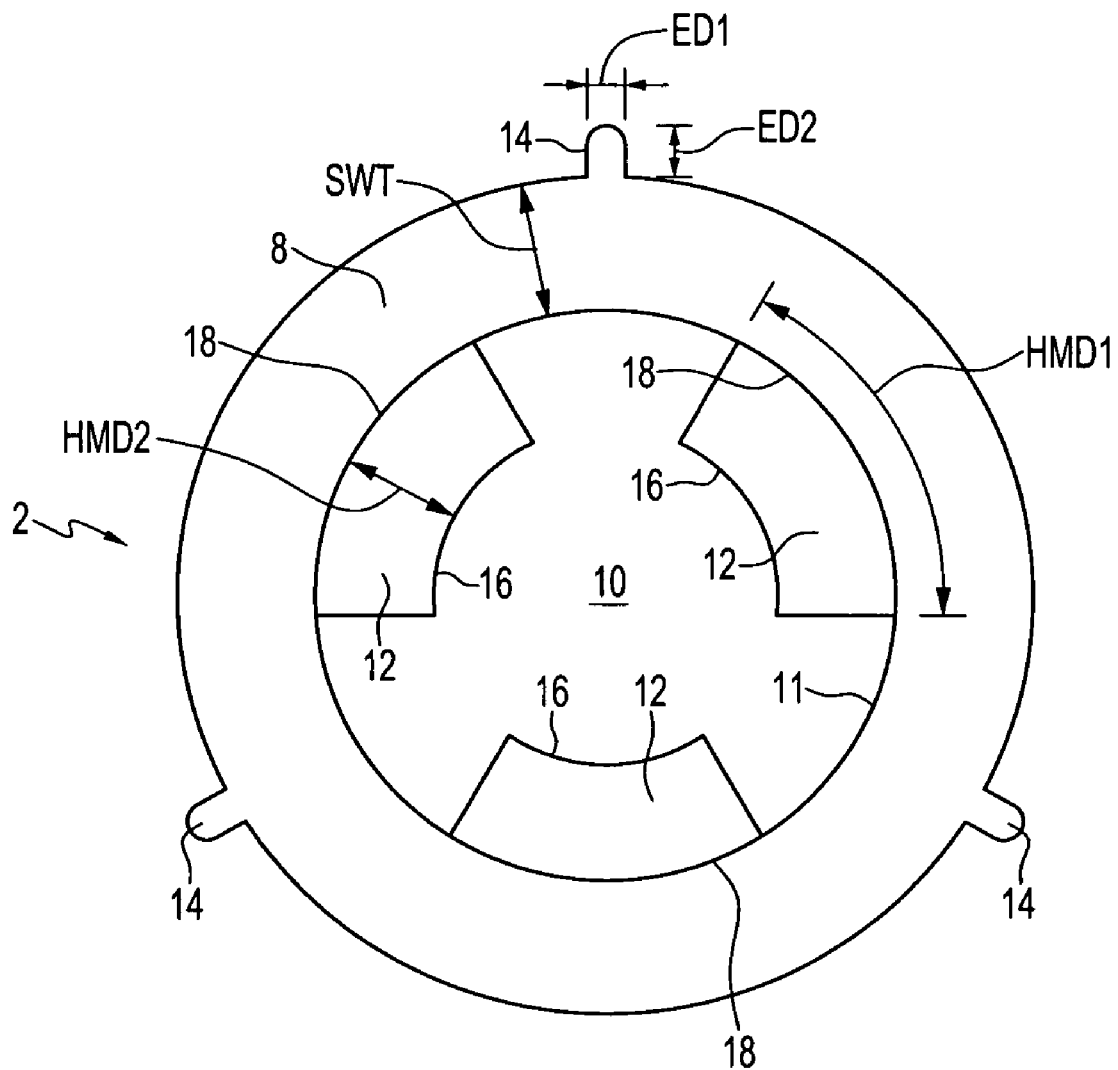
FIG. 3 is a plan view of the exemplary flute positioner of FIG. 2 viewed from the line 3—3 in the direction shown.

As shown by FIGS. 1–3, the exemplary flute positioner 2 includes a body 6 that is defined by a generally cylindrical sidewall 8 and that is configured to be received in the barrel B. A throughbore 10 is defined by an inner surface 11 of the sidewall 8 and extends through the body in the direction of its major axis. At least one, and preferably a plurality of holding members 12 extend from the sidewall 8 radially inward into the throughbore 10, and are configured to engage the fastener 4. A plurality of extensions 14 extends radially outward from the sidewall 8 exterior surface 13. In the exemplary flute positioner 2, the holding members 12 are configured as lobes and the extensions 14 are configured as fins. The precise number and shape of the holding members 12 and/or the extensions 14 may vary to suit the application.

As illustrated by FIG. 2, the exemplary flute positioner 2 includes three fins 14. Other numbers of fins 14 may be provided, with from one to six being preferred, and from three to six a more preferred number. The fins 14 are preferably spaced equidistantly about the perimeter of the body 6, and preferably extend for the entire length of the body 6 in its axial direction. The fins 14, body 6 and holding members 12 are preferably made of a flexible material such as a thermoplastic, with polyvinyl chloride being one example.

Three holding members 12 are provided in the exemplary flute positioner 2, with from three to six holding members a preferred number. The exemplary holding members 12 are preferably spaced equidistantly about the perimeter of the throughbore 10. As shown by FIG. 3, each holding member 12 includes a concave engaging surface 16 for engaging a shaft 15 of the fastener 4 (FIG. 1), and a base 18 that is proximate to the sidewall 8. The preferred holding members 12 are each tapered from their base 18 to their engaging surface 16. The holding members 12 also preferably extend in the axial direction of the cylindrical sidewall 8 for the entire length of the sidewall. However, it is contemplated that the length of the members may vary to suit the application. Preferably, the holding members 12 and the fins 14 are staggered or interspersed with one another about the circumference of the sidewall 8. That is, each holding member 12 is placed at a location on the interior of the sidewall 8 that is between two fin 14 locations on the exterior of the sidewall 8. The holding members 12 are preferably somewhat flexible and compressible in the radial direction towards the sidewall 8, with the result that different fasteners 4 with different diameter shafts can be accommodated.

Figure 4:
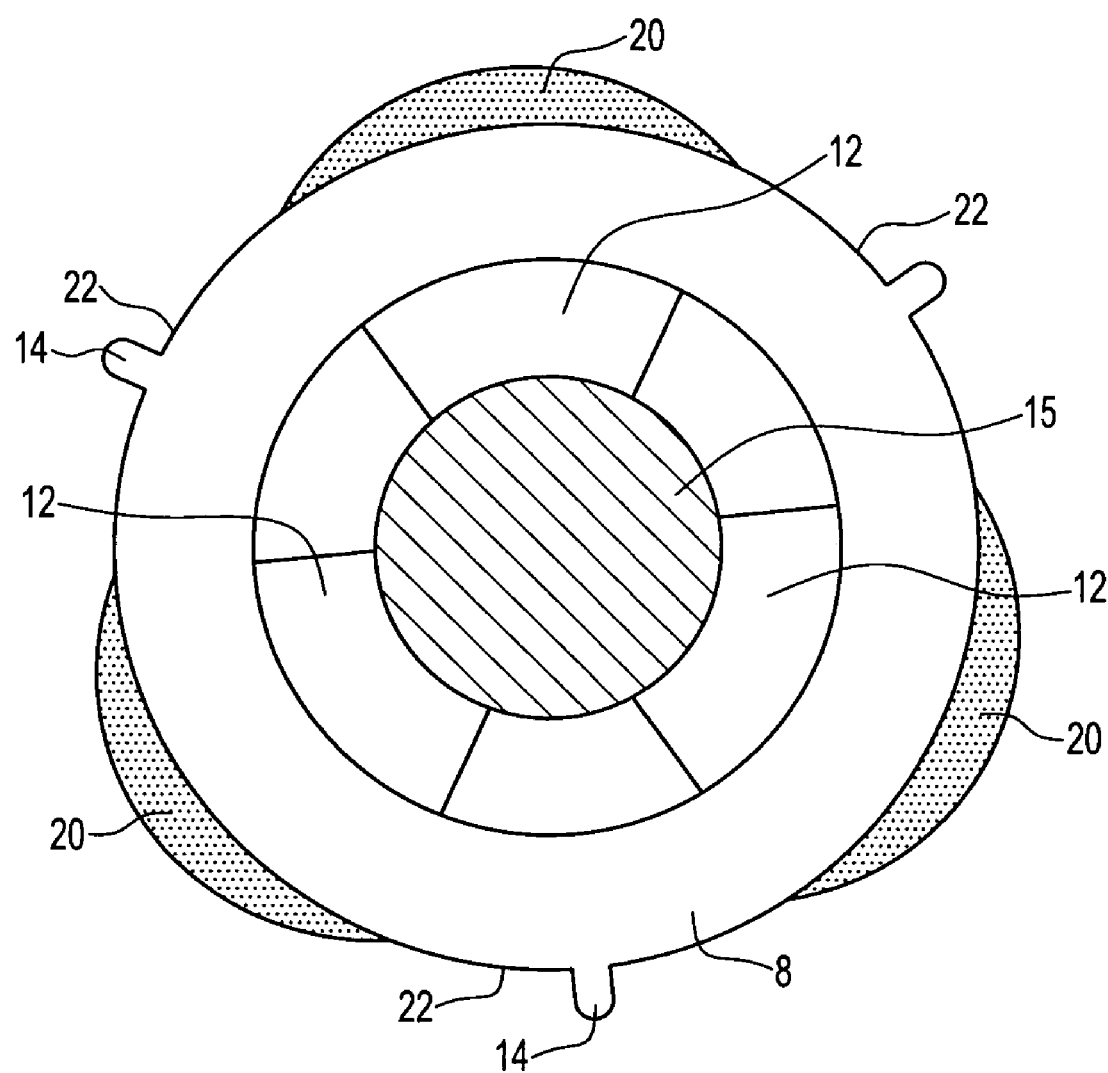
FIG. 4 is the view of FIG. 3 with a fastener (shown in cross section) engaged in the exemplary flute positioner; and, FIG. 5 is the view of FIG. 4 with the exemplary flute positioner engaged in the barrel (shown in cross section) of a driving tool.

FIG. 4 is a top plan view of the exemplary flute positioner 2 with the fastener shaft 15 (shown in cross section) engaged with the lobes 12 in the throughbore 10. As illustrated, engagement between the lobes 12 and the fastener shaft 15 causes the sidewall 8 to deform. In particular, the darkly shaded regions 20 of the sidewall 8 bulge radially outward as illustrated. It will be appreciated that these regions 20 extend generally along the entire axial length of the sidewall 8, as shown by FIG. 1. However, it is contemplated that the length of the regions 20 may vary to suit the application. The sidewall bulging regions 20 occur in areas that are generally adjacent to the holding member bases 18. Although all of the circumference of the sidewall 8 may bulge to some degree, the holding members 12 are configured to cause the bulging regions 20 to preferably show substantially more deformation than do other regions 22 of the sidewall that are proximate to the fins 14. Preferably, the sidewall regions 22 proximate to the fins 14 do not substantially bulge outward.

Figure 5:
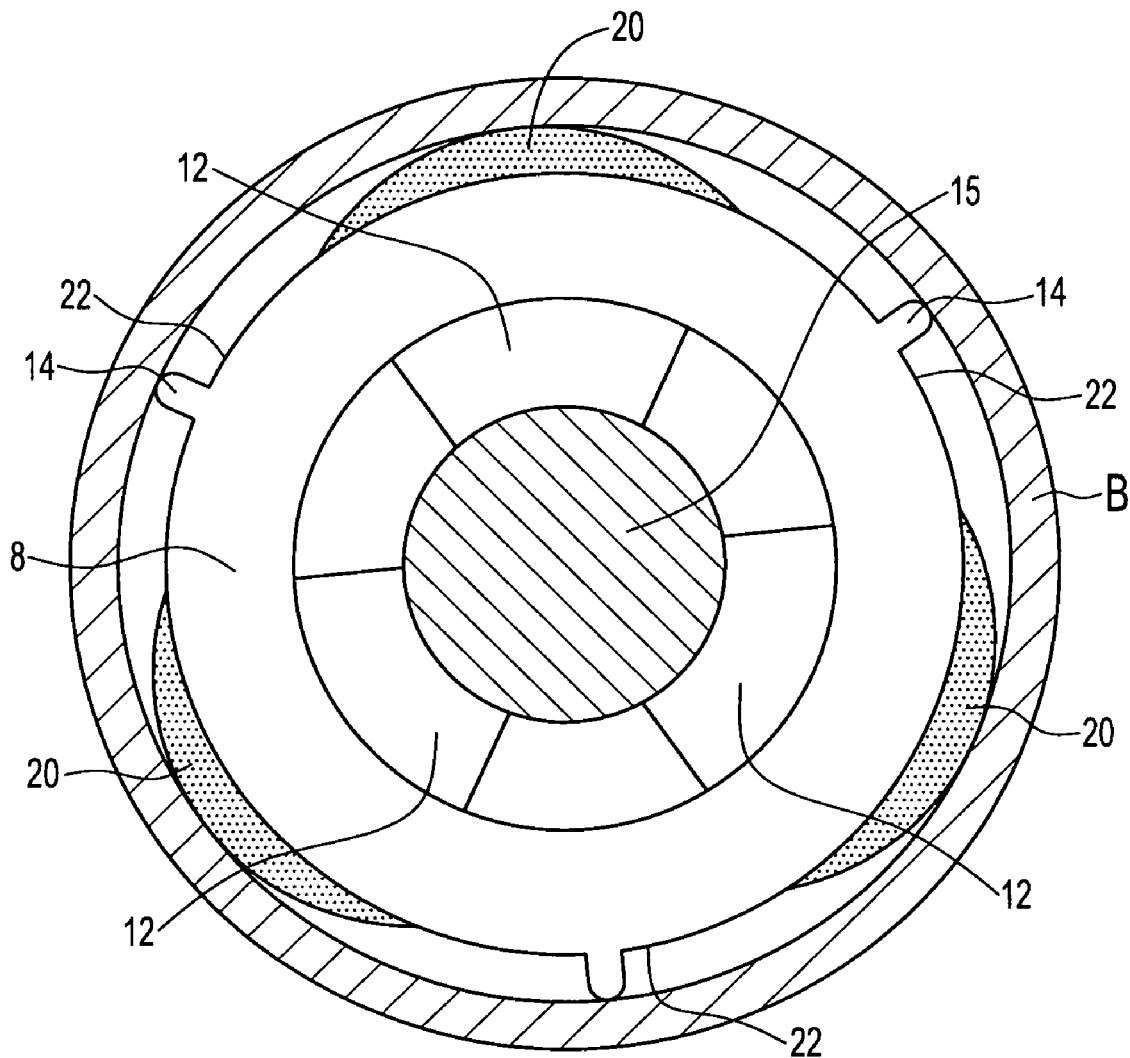

FIG. 5 shows the flute and fastener engaged in the barrel B, with the barrel shown in cross-section. As illustrated, the bulging sidewall regions 20 are useful for frictionally engaging the barrel B. It has been discovered that the engagement between the bulging sidewall regions 20 and the barrel B is useful to provide desirable guidance for the positioning of the flute 2 within the barrel. While the fins 14 may engage the barrel B, it has been discovered that the engagement of the bulging sidewall regions 20 can provide a larger engagement area and can substantially enhance the holding power and guidance of the barrel B. Also, because the bulging sidewall regions 20 extend in an axial direction along the sidewall 8, they are believed to promote self-aligning of the flute 2 as it travels through the barrel B that facilitates a desirable straight ejection from the barrel. Testing has indicated that use of the exemplary flute positioner 2 can substantially increase the occurrence of desirable angles of insertion of fasteners 4 into substrates.

Note also that the regions 22 show little or no outward bulge. It is contemplated that in other invention embodiments noticeable bulge will occur in these regions 22 depending, for instance, on the diameter of the fastener shaft 15 engaged. It is preferred that the amount of outward bulge in the regions 22 be less than that of the regions 20. Finally, it will be appreciated that in some embodiments of the invention no fins 14 are provided, and that engagement with the barrel B will occur only at the bulging sidewall regions 20.

Achieving desirable engagement between the flute 2 and the barrel B depends to an extent on the firmness of engagement between the bulging sidewall regions 20 and the barrel. The firmness of engagement partially depends on the amount of sidewall 8 that deforms when the holding members 12 engage the fastener shaft 15. A balance must be achieved between too much deformation and too little, since neither too firm nor too loose of an engagement with the barrel B is desirable. It has been discovered that various elements of the flute positioner 2 interact with one another to determine the amount of sidewall 8 deformation that occurs, and that a beneficial amount of deformation can be achieved through choice of element configuration, placement, materials of construction and dimensions.

For example, the amount of sidewall 8 deformation that creates the bulging regions 20 can be partially controlled through selection of the thickness and hardness of sidewall 8, as well as the size, placement, and hardness of the holding members 12. Those knowledgeable in the art will appreciate that these factors may all interrelate with one another, and that a variety of particular combinations will prove to be suitable.

Referring again to FIG. 3, it has been discovered that a beneficial amount of sidewall 8 deformation occurs when the holding members 12 extend along the generally circular perimeter of the sidewall 8 for a portion of the perimeter of the sidewall 8 illustrated in FIG. 3 as generally arcuate distance HMD1 that is between about ⅛ and ¼ of the overall perimeter of the sidewall 8. When considering FIG. 3, it should be kept in mind that the FIG. and its referenced distances and thicknesses are illustrative only, and that no particular scale is intended. It will be appreciated that in other embodiments of flutes of the invention, the sidewall may be shapes other than cylindrical, and the distance HMD1 may not be an arc length.

In the exemplary flute 2 with its generally cylindrical sidewall 8, a preferred arc length for the arc HMD1 is between about 45° and about 90°. As best illustrated by FIGS. 4 and 6, this relative portion of the sidewall 8 perimeter has been discovered to be suitable to effectively distribute the outward force from the holding members 12 when engaged by the fastener 4. Spreading this force over too narrow a portion of the perimeter of the sidewall 8 can cause undesirable strain on the sidewall and the bulging sidewall regions 20 to extend too far radially outward. Spreading this force over too wide a portion of the sidewall 8, on the other hand, can result in bulging sidewall regions 20 that do not extend far enough radially outward.

It is also preferred that the fins 14 extend along the circumference of the sidewall 8 for a portion of the sidewall perimeter that is illustrated in FIG. 3 as a distance ED1 that is less than about half HMD1. With reference again made to FIG. 4, this preferred distance ED1 in combination with the staggered or interspersed circumferential placement relative to the holding members 12 helps to prevent the fins 14 from being forced too far radially outward. Overextension of the fins 14 could result in undesirably tight engagement between the flute 2 and the tool barrel B. It has also been discovered that beneficial deformation of the sidewall 8 results when the holding members 12 extend from the inner sidewall surface 11 radially into the throughbore 10 by a distance illustrated as HMD2 that is greater than the radial distance that the fins 14 extend radially outward from the sidewall 8 illustrated as ED2.

It has also been discovered that maintaining a relationship between the thickness of the sidewall 8, illustrated in FIG. 3 as SWT, and the distances HMD2 and ED2 can be useful in achieving a desirable amount of deformation of the sidewall 8. For example, the sidewall thickness SWT is preferably within about 25% of (i.e., from about 75% to 125% of) the distance HMD2 and within about 25% of the distance ED2. Also, the distance HMD2 that the holding members extend radially into the throughbore 10 from the sidewall 8 is preferably greater than the distance that the fins 14 extend radially outward from the sidewall 8.

In summary, the following dimensional relationships have been discovered to be useful for practice of the invention. In considering these useful ranges, it should be kept in mind that the referenced distances and thicknesses as illustrated in FIG. 3 are illustrative only, and may be outside of these ranges.

(¼ sidewall perimeter)≧HMD1≧(⅛ sidewall perimeter)
HMD1≧(2×ED1)
HMD2≧ED2
(125%×HMD2)≧SWT≧(75%×HMD2) and (125%×ED2)≧SWT≧(75%×ED2)

It will be appreciated that particular dimensions will vary with applications. However, it is believed that values that offer useful benefits in many applications include the sidewall 8 thickness SWT being about 0.05 to about 0.1 inches, the holding member 12 distance HMD2 being about 0.05 to about 0.1 inches, and the fin 14 extension distance ED2 being about 0.05 to about 0.1 inches. These dimensions have shown acceptable deformation of the sidewall 8 when the sidewall 8, the holding members 12, and the fins 14 all have a hardness of about 80 to about 90 durometer shore A. The length of the body 6 in the direction of the axis of the cylindrical sidewall 8 may also have an effect on the relative size of the bulging sidewall regions 20. It has been discovered that a useful length in this direction for many applications is between about 0.2 and about 0.15 inches.

The configuration of the exemplary flute positioner 2 is also believed to offer benefits and advantages in that it is well suited for large-scale manufacture through a continuous extrusion process using a thermoplastic. When taking advantage of this process for manufacture of the flute 2, the sidewall 8, the holding members 12, and the fins 14 will all be integral with one another. Those knowledgeable in the art will appreciate that many different materials will be suitable for manufacture of the flute positioner 2, and may be selected based on considerations including cost, hardness, appearance, durability, and the like. It has been discovered that one beneficial thermoplastic material of construction is polyvinyl chloride.

It will be appreciated that although exemplary embodiments of the invention have been shown and discussed herein, these are exemplary only and are not exhaustive of the invention. Those knowledgeable in the art will readily recognize that many equivalents and alternatives are possible within the invention. Also, it will be appreciated that the figures presented herein are illustrative only, and that their particular dimensions and scales are not intended to limit the scope of the invention.

What is claimed is:

1. A flute positioner for positioning a fastener in the barrel of a tool comprising:
    a generally cylindrical sidewall having a thickness and a perimeter;
    a plurality of flexible fins extending radially outward from said sidewall by a first distance, each of said flexible fins having a width in the direction of the sidewall perimeter;
    a throughbore defined by said cylindrical sidewall; and,
    a plurality of holding members extending from said sidewall radially inward into said throughbore by a second distance that is greater than said first distance, each of said holding members having a width in the direction of said sidewall perimeter that is at least twice as large as said flexible fin width, each of said holding members being tapered from a base adjacent to said sidewall to a distal concave engaging surface, each of said holding members configured to cause at least a region of said sidewall to bulge outward and into engagement with the tool barrel when said holding members engage a fastener and before a driving force is exerted onto the fastener from the tool.

2. A flute positioner as defined by claim 1 wherein said plurality of flexible fins comprises three to six flexible fins spaced equidistantly about said body.

3. A flute positioner as defined by claim 1 wherein said throughbore perimeter has a major axis, wherein said plurality of holding members are spaced equidistantly about the perimeter of the throughbore, and wherein said holding members extend along said major axis for the length of said throughbore.

4. A flute positioner as defined by claim 1, wherein said plurity of holding members comprises three holding members that each extend along said perimeter for about ⅛ to about ¼ of said perimeter.

5. A flute positioner as defined by claim 1 wherein said plurality of holding members and said plurality of extensions are staggered relative to one another.

6. A flute positioner as defined by claim 5 wherein each of said holding members is configured to cause a region of said body that is proximate to said each holding member to bulge radially outward and into engagement with the tool barrel when said each holding member engages the fastener and before the tool exerts a driving force onto the fastener, while regions of said body proximate to said extensions do not substantially bulge outward.

7. A flute positioner for positioning a fastener in a tool barrel comprising:
    a body having a substantially cylindrical sidewall and a major axis;
    a plurality of extensions extending radially outward from said sidewall;
    a throughbore extending through said body and along the major axis of said body; and,
    from three to six holding members extending radially into said throughbore, each having a base adjacent to said sidewall that extends for about ⅛ to about ¼ of the circumference of said sidewall and being at least about twice the width of said extensions, each being tapered from said base to a concave engaging surface distal from said base, said holding members spaced equidistantly about a circumference of said cylindrical sidewall and staggered with said plurality of extensions, said holding members configured for causing regions of said sidewall that are proximate to said holding members to bulge outward when they engage a fastener, while regions of said sidewall that are proximate to said fins do not substantially bulge outward.

8. A flute positioner as defined by claim 7 wherein said body has a major axis and a length along said major axis, and wherein said plurality of extensions each comprise a fin that has a length coincident with said body length.

9. A flute positioner as defined by claim 7 wherein said body has a sidewall with a thickness, said plurality of extensions extending out from said body for a distance that is within about 25% of said sidewall thickness.

10. A flute positioner as defined by claim 7 wherein each of said plurality of extensions extends radially outward from said body by a first distance, and wherein each of said three to six holding members each extends radially into said throughbore by a second distance that is greater than said first distance.

11. A flute positioner as defined by claim 7 wherein said body sidewall has a thickness of between about 0.1 and about 0.05 inches.

12. A flute positioner as defined by claim 7 wherein each of said holding members extends into said throughbore from said body for a distance of between about 0.1 and about 0.05 inches.

13. A flute positioner as defined by claim 7 wherein said body has a length of between about 0.15 and about 0.2 inches along its major axis.

14. A flute positioner as defined by claim 7 wherein said body has a hardness of between about 80 and about 90 Shore A durometer.

15. A flute positioner as defined by claim 7 wherein said body includes a sidewall, and wherein said three to six holding members are configured to cause at least a region of said sidewall to bulge outward into engagement with said tool barrel when said three to six holding members engage the fastener and before a driving force is exerted on the fastener by the tool wherein the holding power of the positioner in the barrel is increased before a driving force is exerted on the fastener by the tool.

16. A flute positioner as defined by claim 15 wherein said at least one holding member is configured to cause selected regions of said sidewall to bulge outward more than other regions of said sidewall when said at least one holding member engages the fastener.

\* \* \* \* \*